(No Model.)
J. W. CARPENTER.
COFFEE BOILER.
No. 523,656. Patented July 31, 1894.
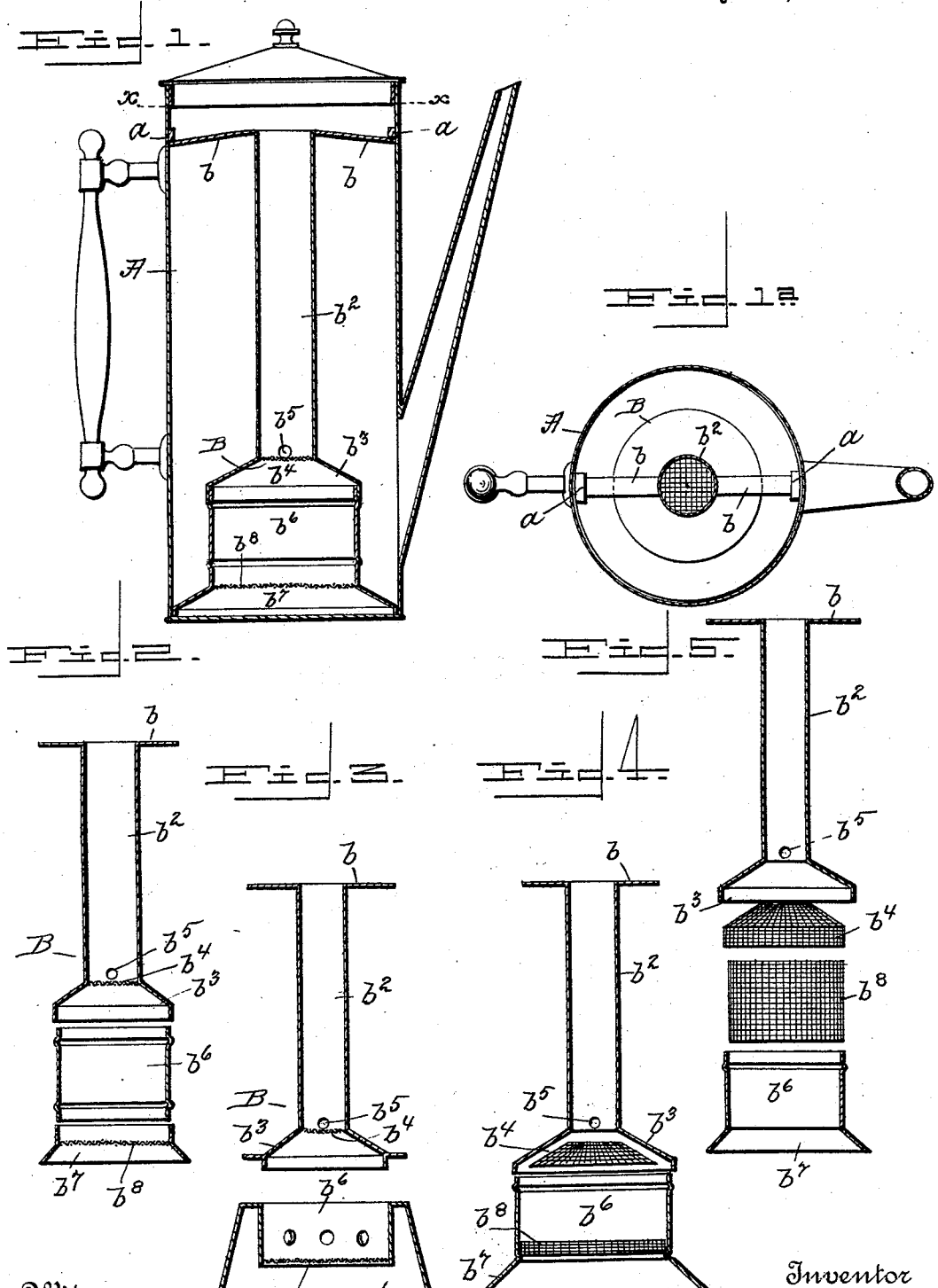
Witnesses
J. T. Harris
W. H. Pumphrey
Inventor
John W. Carpenter,
by Evert & Appleman
Attorneys

UNITED STATES PATENT OFFICE.

JOHN W. CARPENTER, OF BRIDGEWATER, VIRGINIA.

COFFEE-BOILER.

SPECIFICATION forming part of Letters Patent No. 523,656, dated July 31, 1894.

Application filed September 27, 1893. Serial No. 486,586. (No model.)

*To all whom it may concern:*

Be it known that I, JOHN W. CARPENTER, a citizen of the United States of America, residing at Bridgewater, in the county of Rockingham and State of Virginia, have invented certain new and useful Improvements in Coffee-Boilers, of which the following is a specification, reference being had to the accompanying drawings.

This invention relates to certain new and useful improvements in coffee and tea pots.

The object of the invention among other things is to provide a novel steeper in combination with and applicable to any well-known form of coffee or tea pot, the construction of the steeper being such, that the coffee or tea shall be confined within a suitable chamber which communicates with the main boiler, and at the same time so located as to form part of a casing through which a continuously moving current of water passes.

A further object is to employ such novel construction by which the action of applied heat to the main boiler shall tend to constantly agitate the liquid and form the same into a current, the course of which will be automatically directed upwardly through the chamber containing the coffee, tea or other substance, thereby effecting a thorough extraction of the volatile elements which are at once condensed, and distributed through the liquid until it becomes saturated.

A further object is to provide simple and convenient means by which the steeper may be readily separated or taken apart for purposes of cleansing, repairing, &c., which is an important feature of my invention, since the production of good coffee or tea necessarily requires that all foreign substances, small adhering particles of stale coffee, &c., be first removed.

With these and other objects in view, the invention comprises various combinations, arrangements and details which will be hereinafter fully set forth and specifically pointed out in the claim following the description.

In describing the invention in detail, reference is had to the accompanying drawings which form part of this specification, and wherein like letters indicate corresponding parts in the several views, in which—

Figure 1, is a central vertical sectional view showing a well-known form of coffee or tea pot with one form of steamer embodying my improvements applied thereto. Fig. 1ª, is a horizontal section view taken about the line $x, x$, of Fig. 1. Fig. 2, is a similar view, showing in detail a modified form of steeper with the parts detached or separated. Figs. 3, 4 and 5, are similar views showing further modifications.

In the drawings, A, denotes a common form of coffee pot which is provided interiorly and adjacent to the mouth with suitable formed lugs $a$, arranged diametrically opposite each other.

B, represents the steeper, and $b$, spring metal arms, which project radially from the vertical tube $b^2$, and engage the under sides of the lugs $a$, thereby securely holding the steeper at all times in proper position to allow for the immersion and draining the pot, without necessarily removing the steeper. At the base of this tube $b^2$, that is at the point of connection with the downwardly and outwardly flared cup $b^3$, a screen $b^4$, is either rigidly secured as in Fig. 1, or removably held in position as in Figs. 4 and 5, and immediately above the screen several openings $b^5$, are formed in the tube for a purpose to be hereinafter described; $b^6$, is the coffee chamber of the steeper, which is closed at the upper end by the cap and screen $b^3$, $b^4$, and provided with a base $b^7$, flared to fit snugly within the pot A, and having a dividing screen $b^8$, at the point of connection with the wall of the chamber. This flared base incloses and forms what is herein known as the steam generating chamber and may be rigidly or detachably secured as shown in Figs. 1 and 2, and with the screen fixed or removable as desired.

In Fig. 3, the steam chamber is enlarged by slightly reducing the diameter of the coffee chamber and extending the wall of the flared base to the mouth of said chamber. At the same time, a further advantage is gained by this alteration, viz., steam or hot air is introduced through a series of openings located substantially centrally of the length of the coffee chamber, thereby aiding materially in readily separating the volatile elements of the coffee.

Referring to Figs. 2 and 4, I have shown detachable screens; in the former, the screens are of a shallow disk-like shape, while in the latter they are more nearly approximate a cup-shape and are so proportioned as to fit one within the other.

The operation is as follows: Owing to the location of the coffee chamber, that is to say, directly above, yet out of contact with the bottom of the boiler or pot, it is possible to steep any desired quantity of coffee and assuming that the proper amount of coffee has been placed within the chamber and the steeper secured as aforesaid, water is poured into the boiler and heat applied thereto.

On reference to the drawings, it will be observed that the flaring base of the steeper entirely covers the bottom of the boiler, therefore the main portion of steam generated must of necessity be inclosed and confined within this chamber, with only one passage for escape, which is through the coffee chamber. Again, it has been found advantageous to slightly obstruct the upward flow of the steam after entering the coffee chamber, and retain it for a time therein. To accomplish this, the upper screen has been given a reduced diameter, that is, about half that of the lower, thus the elements will be more speedily volatilized owing to the continued action of the confined steam. As the steam and released elements pass from the coffee chamber, they escape through the opening at the base of the steeper-tube and are condensed before rising to the surface of the water in the boiler, which results in obvious advantages.

As the water contained in the steam chamber becomes converted into steam and passes upwardly, the pressure of air in the boiler will force the partially saturated liquid under the flared base of the steeper to refill the chamber, as above described.

It may be also mentioned that by the peculiar construction of the vertical tube —$b^2$—, a common objection, viz., boiling over of the liquid, is effectually overcome.

Having fully described my invention, what I claim as new, and desire to obtain by Letters Patent, is—

The combination with a vessel, of a steeper removably locked therein and comprising a receiving chamber provided with a detachable flared base, a tapering cap having centrally thereof a vertically projecting tube and openings formed at the point of connection, and screens within and forming the top and bottom of said chamber, as specified.

In testimony whereof I affix my signature in presence of two witnesses.

JOHN W. CARPENTER.

Witnesses:
D. G. WHITMORE,
JOS. BYRD.